United States Patent
Kuang et al.

(10) Patent No.: US 9,709,750 B1
(45) Date of Patent: Jul. 18, 2017

(54) 2-DIMENSIONAL FIBER ARRAY STRUCTURE

(71) Applicant: Alliance Fiber Optic Products, Inc., Sunnyvale, CA (US)

(72) Inventors: Wen-Lung Kuang, Taoyuan County (TW); Ming-Sung Wu, New Taipei (TW)

(73) Assignee: Alliance Fiber Optic Products Inc., Sunnyvale, CA (US)

( * ) Notice: Subject to any disclaimer, the term of this patent is extended or adjusted under 35 U.S.C. 154(b) by 0 days.

(21) Appl. No.: 15/188,085

(22) Filed: Jun. 21, 2016

(51) Int. Cl.
*G02B 6/36* (2006.01)
*G02B 6/38* (2006.01)

(52) U.S. Cl.
CPC ......... *G02B 6/3676* (2013.01); *G02B 6/3636* (2013.01); *G02B 6/3652* (2013.01); *G02B 6/3881* (2013.01)

(58) Field of Classification Search
CPC .. G02B 6/3672; G02B 6/3676; G02B 6/3636; G02B 6/3652; G02B 6/3838; G02B 6/3839; G02B 6/3881; G02B 6/4243
USPC .... 385/52, 65, 76–78, 81, 83, 136, 137, 147
See application file for complete search history.

(56) References Cited

U.S. PATENT DOCUMENTS

| | | | | |
|---|---|---|---|---|
| 6,665,487 B2* | 12/2003 | Wang | .................. | G02B 6/4249 385/134 |
| 6,726,372 B1* | 4/2004 | Sherrer | ................ | G02B 6/3672 385/83 |
| 6,819,858 B2* | 11/2004 | Steinberg | ............. | G02B 6/3636 385/134 |
| 2003/0174998 A1* | 9/2003 | Shevchuk | ............ | G02B 6/3885 385/137 |
| 2009/0142028 A1* | 6/2009 | Martinez | .............. | G02B 6/3636 385/137 |
| 2010/0310214 A1* | 12/2010 | Miyadera | ............. | G02B 6/3636 385/91 |
| 2013/0136401 A1* | 5/2013 | Cooke | .................. | G02B 6/3885 385/80 |
| 2014/0010499 A1* | 1/2014 | Suematsu | ............ | G02B 6/3881 385/65 |
| 2016/0070074 A1* | 3/2016 | Wang | .................. | G02B 6/4231 385/52 |

* cited by examiner

*Primary Examiner* — Robert Tavlykaev
(74) *Attorney, Agent, or Firm* — Dinsmore & Shohl LLP

(57) ABSTRACT

The present disclosure relates to a two-dimensional fiber array structure including a base which includes a baseboard, a cover board and a spacer layer, and an optical fiber cable is positioned between the baseboard and the cover board, positioning fibers are positioned at two external sides of the optical fiber cable, the spacer layer is abutted with two adjacent fiber layers of the optical fiber cable to reduce the position tolerance along X axis for further improving accuracy, whereby ensuring quality and stability of transmitting optical signal.

11 Claims, 12 Drawing Sheets

FIG.10 Section B-B

2-DIMENSIONAL FIBER ARRAY STRUCTURE

BACKGROUND OF THE INVENTION

1. Field of the Invention

The present disclosure relates to a two-dimensional fiber array structure, more particularly to the fiber array structure including a base which includes a baseboard, a cover board and a spacer layer, and an optical fiber cable is positioned between the baseboard and the cover board, positioning fibers are positioned at two external sides of the optical fiber cable, the spacer layer is abutted with two adjacent fiber layers of the optical fiber cable to reduce the position tolerance along X axis for further improving accuracy, whereby ensuring quality and stability of transmitting optical signal.

2. Description of the Related Art

In recent year, as communication technology and Internet Network are rapidly developed, data center and telecommunication venders continuously make effort in products with high density, high transmission rate, large volume and intelligent functions. In order to satisfy requirements in higher data transmission rate, smaller occupied space and lower power consumption, many companies pay more attention in a fiber transmission system which is an important constituent of physical infrastructure. Because of having advantages of larger bandwidth, higher transmission rate, longer transmission distance, thinner volume, better anti-EMI and good confidentiality, the fiber transmission system has been widely applied in many fields.

In basic architecture of the fiber-optic communication, a transmitter converts electric signal into optical signal, the optical signal is then transmitted to a receiver through an optical fiber cable, and the receiver converts the optical signal into the electric signal for receiving. A fiber array having a high optical coupling rate is a best-choice product under a condition that the transmission bandwidth is increased and channel requirements becomes more. The fiber array is an important device connected between the optical fiber cable and a pairing device, and mainly applied in connection between the optical fiber cable and PLC, DWDM system, OXC, OADM, optical router or optical switch. In a manner of installing the fiber array, the fiber array and a laser diode array are aligned first for splice therebetween. For alignment, it is necessary to find the location where the maximum optical coupling rate exists between the laser diode array and the fiber array, so as to facilitate splicing process later. In other manner, the alignment of optical coupling location is omitted before the fiber array and the laser diode array are spliced, and the package yield is mainly dependent on the manner of splicing and positioning the fiber array and the baseboard, such as manner of adhesive, soft-soldering or laser welding.

In the conventional fiber array, a glass baseboard includes a cover board and a chip which includes a plurality of longitudinal V-shaped grooves. A plurality of fibers are respectively disposed in the V-shaped grooves of multiple glass substrates, and the multiple glass substrates are then stacked to form the conventional fiber array. The fibers are respectively positioned by the V-shaped grooves to ensure the alignment accuracy of the fibers. The number and density of fibers can be adjusted upon requirement, so as to implement more compact fiber array and miniaturization package. Please refer to FIG. 11. A plurality of fibers B are respectively disposed in the V-shaped A1 of the stacked glass substrates A, and epoxy resin are used for package to form adhesive layers C. However, the surface of the glass substrate A must be carved by a cutting tool to form the V-shaped grooves A1 one by one, which causes long process time and is easy to break the glass substrate A. Moreover, a tolerance may be generated after every machining process by the cutting tool, so the position accuracy of each of the fibers B of the fiber array is reduced, and the quality of transmitting the optical signal through the fiber B is degraded. In addition, the pitch between the two adjacent layers of the fibers B is limited by the capacity of producing the glass baseboard A and the maximum depth of the V-shaped groove A1. In fact, it is very difficult to produce the glass baseboard A with a thickness smaller than 0.3 mm, and multiple processes and stack of layers of the glass baseboards A also cause high cost in keeping accuracy of the fiber array and lower yield rate. In addition, the parallelism between two ends of the glass baseboard A is also not easy to achieve. Therefore, it is very hard to reproduce the high-end fiber array having the fibers B with high-density and micron-level position accuracy.

Some manufacturers use photolithography etching process technology to form the V-shaped groove, so as achieve accuracy and miniaturization of the baseboard. However, this technology is only adapted to the fiber array which uses a wafer as the baseboard, and also has disadvantages of complicated wafer process, material limitation and high cost, which results in bottleneck for application, for example, quick mass production and cost reduction cannot be achieved easily, and the process may cause environment pollution and be not environmentally-friendly. With continuous progress of the material technology, new glass material and plastic material are developed to produce the baseboard by a manner of compression molding or injection molding, so as to reduce the production time of the baseboard. However, after assembly of the baseboard and the plurality of fibers, the epoxy resin is heat-shrinkable or stress-deformable easily to shift fibers, which may result in poor package yield of the fiber array and more insertion loss.

Please refer to FIG. 12. The glass substrate A is coated with epoxy resin on a surface thereof, and the plurality of fibers B are then respectively disposed into the V-shaped grooves A1 of the glass substrate A to form staggered-stacked arrangement, and the cover board D is then placed on the glass substrate A to downwardly abut the V-shaped grooves D1 thereof with outer surfaces of the plurality of fibers B, so as to pinch and position the plurality of fibers B. Next, the epoxy resin is cured to form the adhesive layer C integrally. The stacked structure of the plurality of fiber B can greatly save product space and provide higher position accuracy (such as, about 1 µm to 2 µm). However, the plurality of fibers B are hardly to shift along X or Y axis subject to constraint of the stacked structure, and machining process for the V-shaped grooves A1 and D1 of the glass substrate A and the cover board D may cause tolerance, so the problem of position tolerance and accumulated error are also generated to make the fibers B easily shifted when the stacking number or disposal number of the fibers B is increased, which results in reduction in position accuracy of each of the fibers B of the fiber array. Moreover, when each of the fibers B has different accuracy, the insertion loss may be increased and the return loss is decreased, thereby impacting quality of transmitting optical signal.

In conclusion, what is need is to design machining process and structure of the fiber array to contain more number of the fibers and provide better precision of package with lower cost, so as to meet the requirement in the practical application of the fiber array.

SUMMARY OF THE INVENTION

In order to solve above-mentioned problem and drawback, the inventor of the present disclosure collects a lot of related documents to finally design the two-dimensional fiber array structure according to long-term experience and multiple tests.

An objective of the present disclosure is to provide a two-dimensional fiber array structure including a base, the base includes a baseboard and a cover board disposed above the baseboard, each of the baseboard and the cover board includes at least one first groove recessed on an abutment surface thereof along Z axis, and a plurality of second grooves respectively recessed at two external sides of the first grooves, and the abutment surfaces of the baseboard and the cover board face to each other, and the plurality of second grooves of the baseboard correspond in position to that of the cover board. A plurality of first fiber cores of the optical fiber cable are respectively positioned in the first grooves to form an array of the fiber layers. The second fiber cores of the positioning fibers are respectively positioned in the two second grooves of the base to accurately separate the baseboard from the cover board by predetermined pitch along X axis. A divider or a plurality of third fiber cores of the spacer layer are abutted with the first fiber cores of the two adjacent fiber layers to more accurately separate the two adjacent fiber layers from each other by predetermined pitch along Y axis, so that the position tolerance along X axis becomes smaller and the accuracy is improved. The second fiber core and the third fiber core have diameters of given specification, so that the accuracy can be consistent, and the two-dimensional fiber array structure can be directly used without extra precise machining. Therefore, the two-dimensional fiber array structure of the present disclosure can have higher process yield and is suitable for mass production, so as to further effectively save production cost and ensure the quality and stability of transmitting the optical signal.

Other objective of the present disclosure is that the second fiber cores of the positioning fibers are positioned in the second grooves located at different positions on the base, so that the baseboard and the cover board can be accurately separated from each other by predetermined pitch along X axis, and the plurality of third fiber cores having predetermined diameter or the divider having predetermined thickness can be used to separate the two adjacent fiber layers by predetermined pitch. During machining process, the plurality of first grooves of the base may have tolerances, and when the number of the fiber layers or the first fiber cores of the optical fiber cable is increased, the position tolerance along X axis may be reduced because the plurality of third fiber cores or the divider of the spacer layer more accurately separate the two adjacent fiber layers from each other, whereby the dimension and position accuracy of the fiber array product can be improved, and the loss of light can be reduced to further improve the quality of transmitting optical signal.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
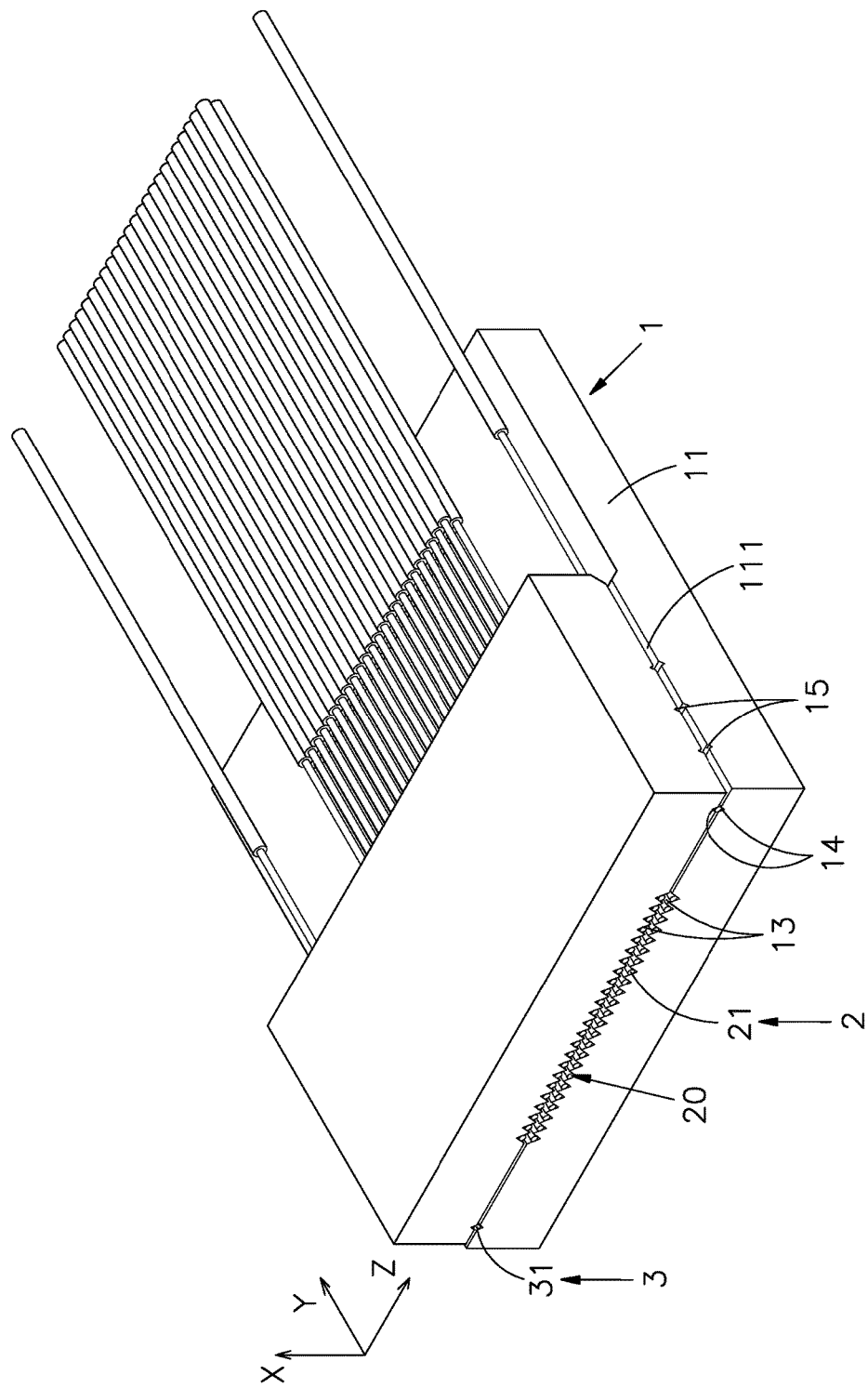
FIG. 1 is an elevational view of a two-dimensional fiber array structure of the present disclosure.
Figure 2:
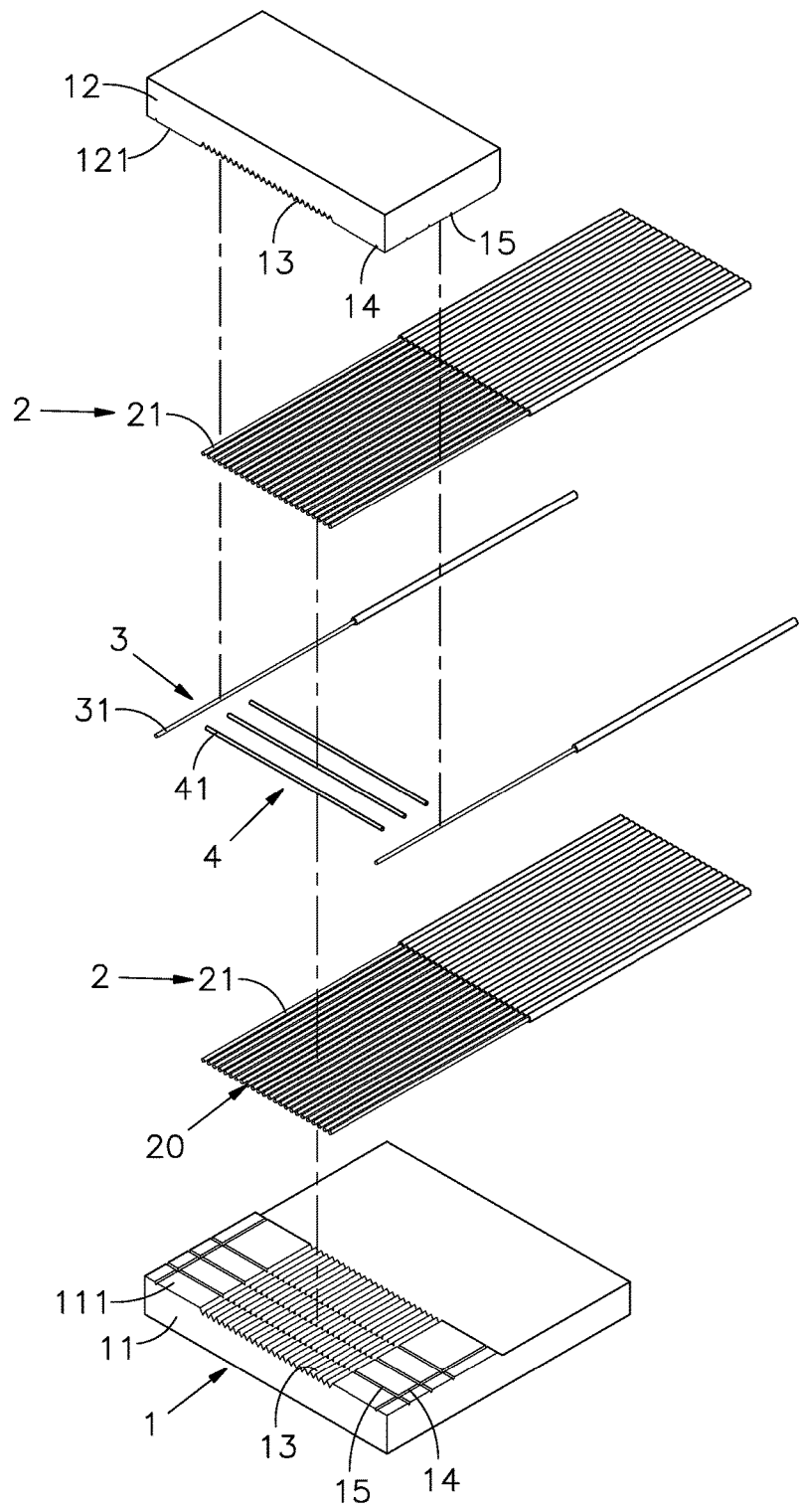
FIG. 2 is an exploded view of the two-dimensional fiber array structure of the present disclosure.
Figure 3:
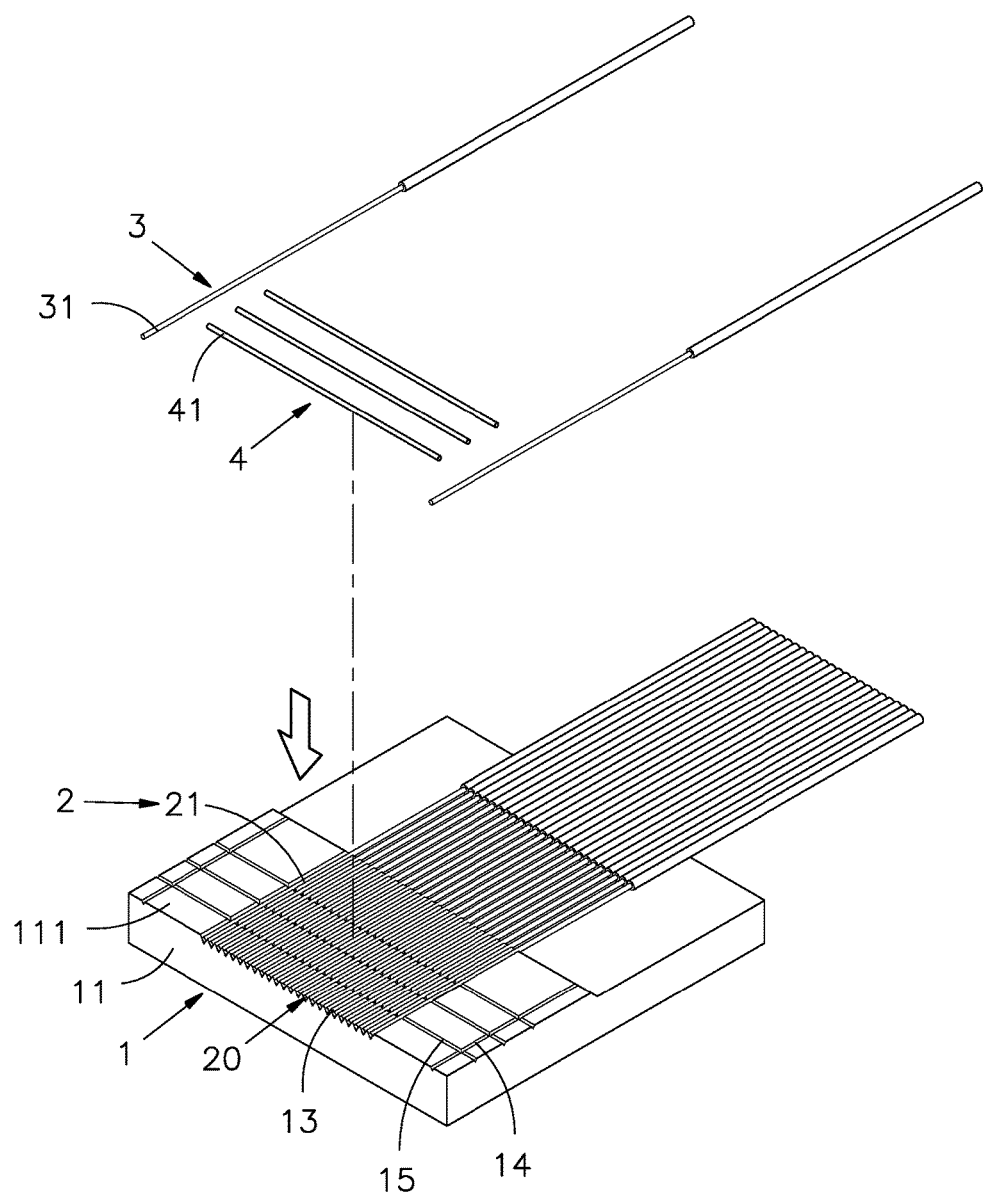
FIG. 3 is an elevational view of the two-dimensional fiber array structure before assembly.
Figure 4:
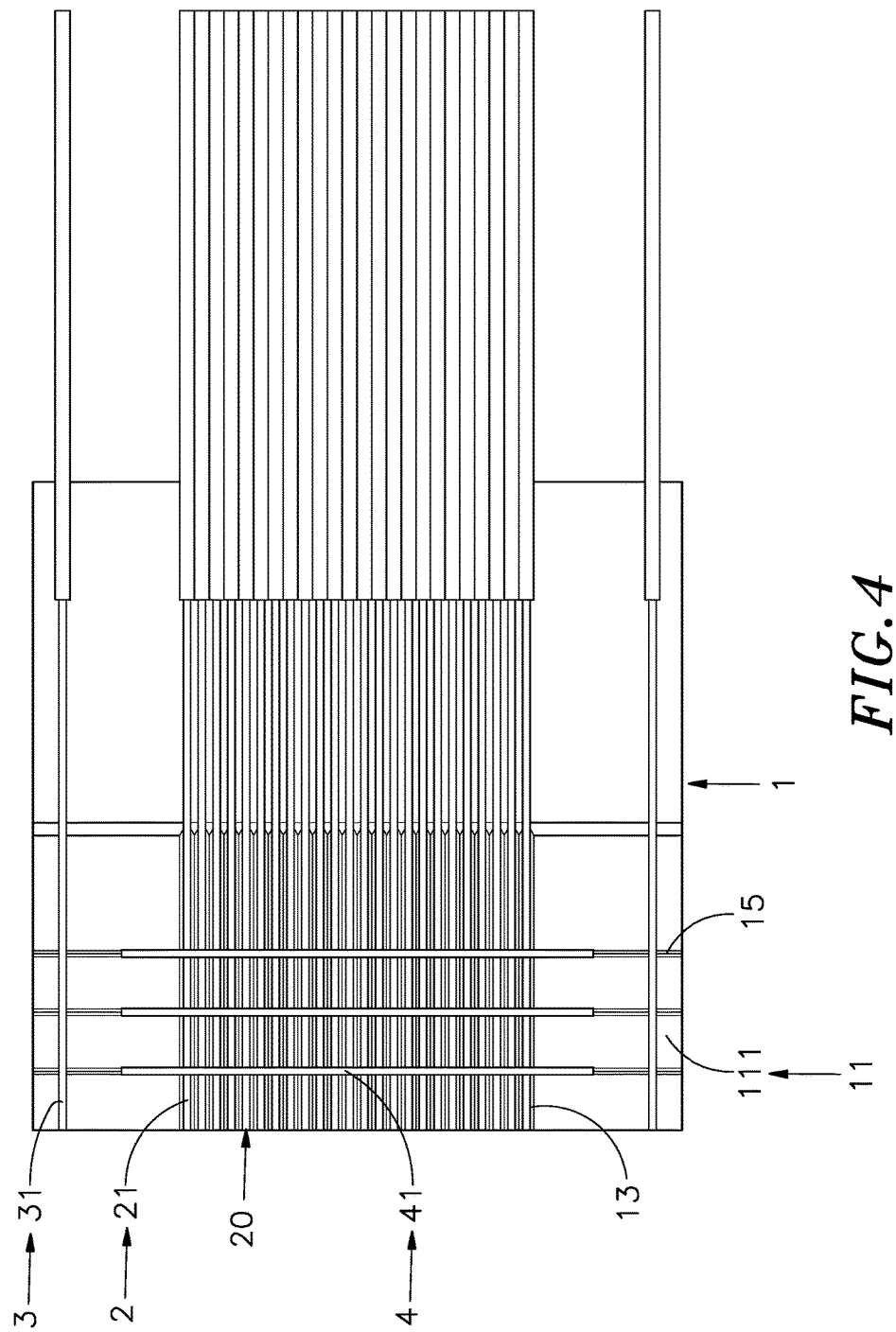
FIG. 4 is a top plain view of the two-dimensional fiber array structure during assembly.
Figure 5:
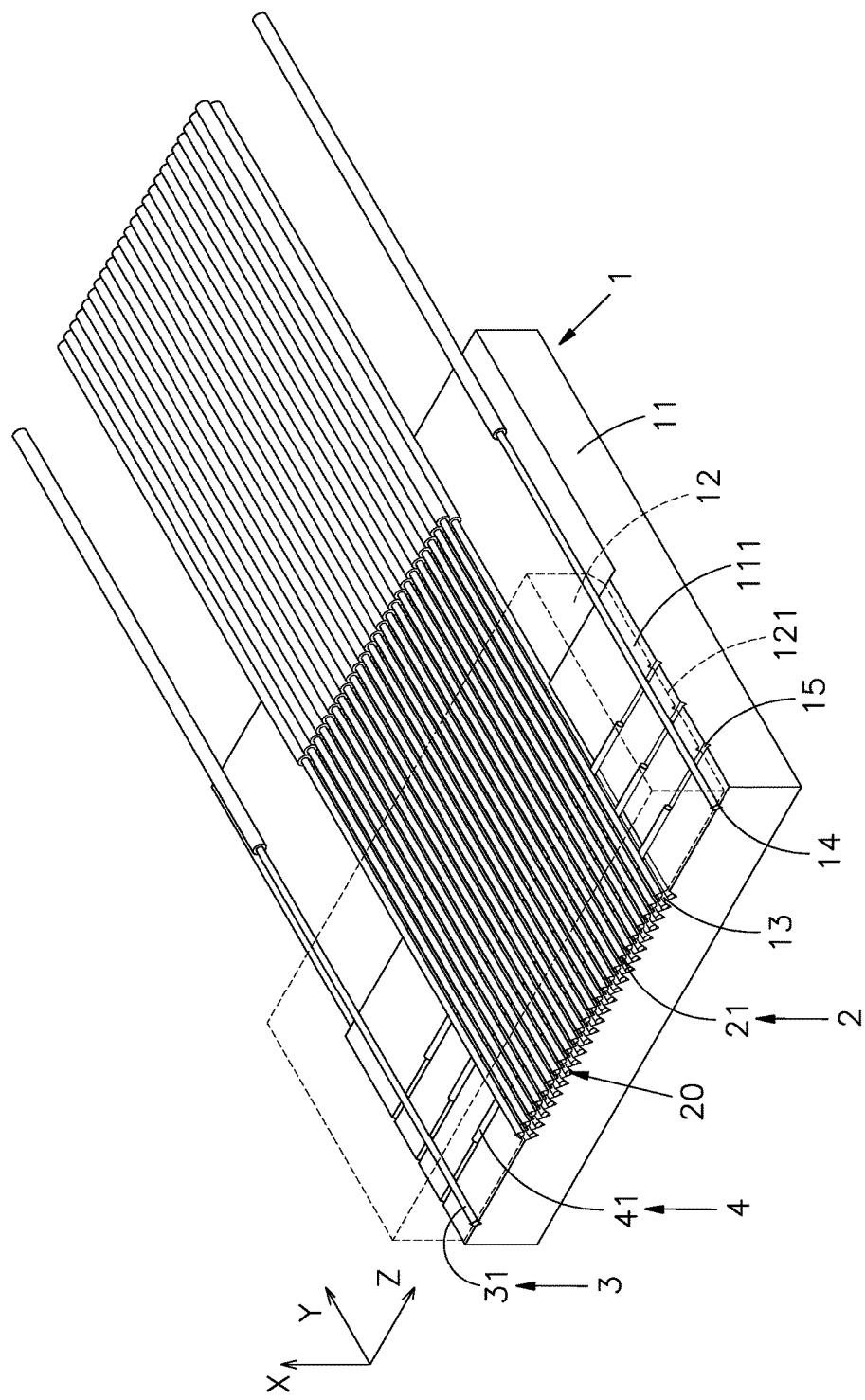
FIG. 5 is an elevational view of the two-dimensional fiber array structure after assembly.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIGS. 1 through 5 which respectively show elevational view of the two-dimensional fiber array structure, exploded view of the two-dimensional fiber array structure, elevational view of the two-dimensional fiber array structure before assembly, top view of the two-dimensional fiber array structure during assembly, and elevational view of the two-dimensional fiber array structure after assembly, in accordance with the present disclosure. The two-dimensional fiber array structure includes a base 1, an optical fiber cable 2, at least two positioning fibers 3, and a spacer layer 4.

The base 1 includes a baseboard 11 and a cover board 12 located over the baseboard 11. Surfaces of the baseboard 11 and the cover board 12 facing to each other are defined as two abutment surfaces 111 and 121, and each of the two abutment surfaces 111 and 121 has a flat shape and is performed high precision machining to form at least one first groove 13 recessed along Z axis thereon. The first groove 13 can be wave-shaped or serrate-shaped, and the multiple first grooves 13 can be continuously or non-continuously arranged in parallel. Along X axis, the first grooves 13 of the baseboard 11 are staggered with that of the cover board 12. By manner of high precision machining, each of the baseboard 11 and the cover board 12 has a plurality of second grooves 14 disposed in parallel to each other, recessed on two external sides of the first grooves 13 and adjacent to an edge thereof, and the second grooves 14 of the baseboard 11 respectively correspond in position to that of the cover board 12. Moreover, in a preferred embodiment, by manner of high precision machining, each of the baseboard 11 and the cover board 12 has a plurality of third grooves 15 respectively recessed in parallel along Y axis and vertically intersected with the first grooves 13 and the second grooves 14. Alternatively, in actual application, the third groove 15 can be omitted upon requirement in structural design or process.

Figure 6:
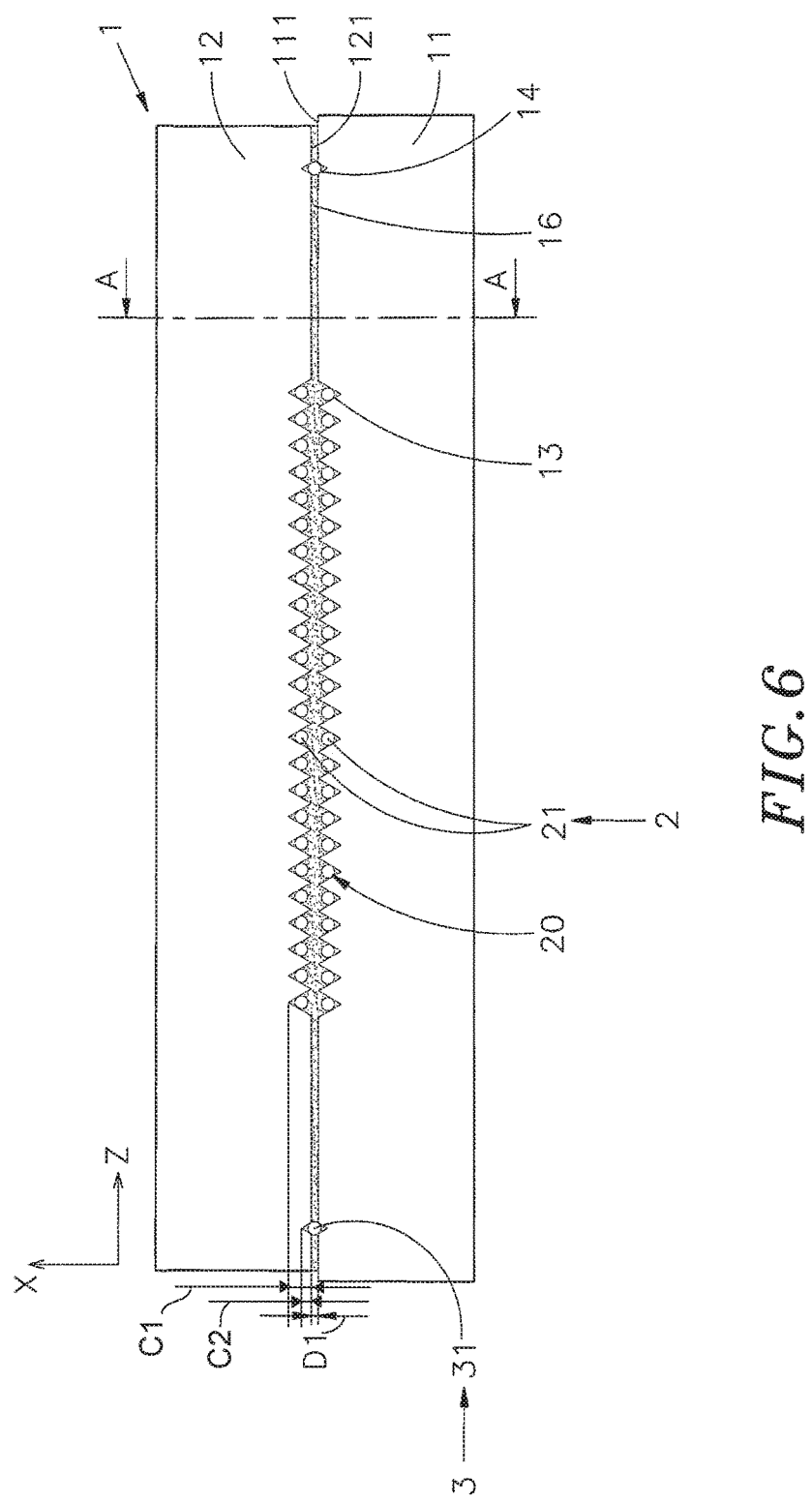
FIG. 6 is a front view of the two-dimensional fiber array structure of the present disclosure.
Figure 7:
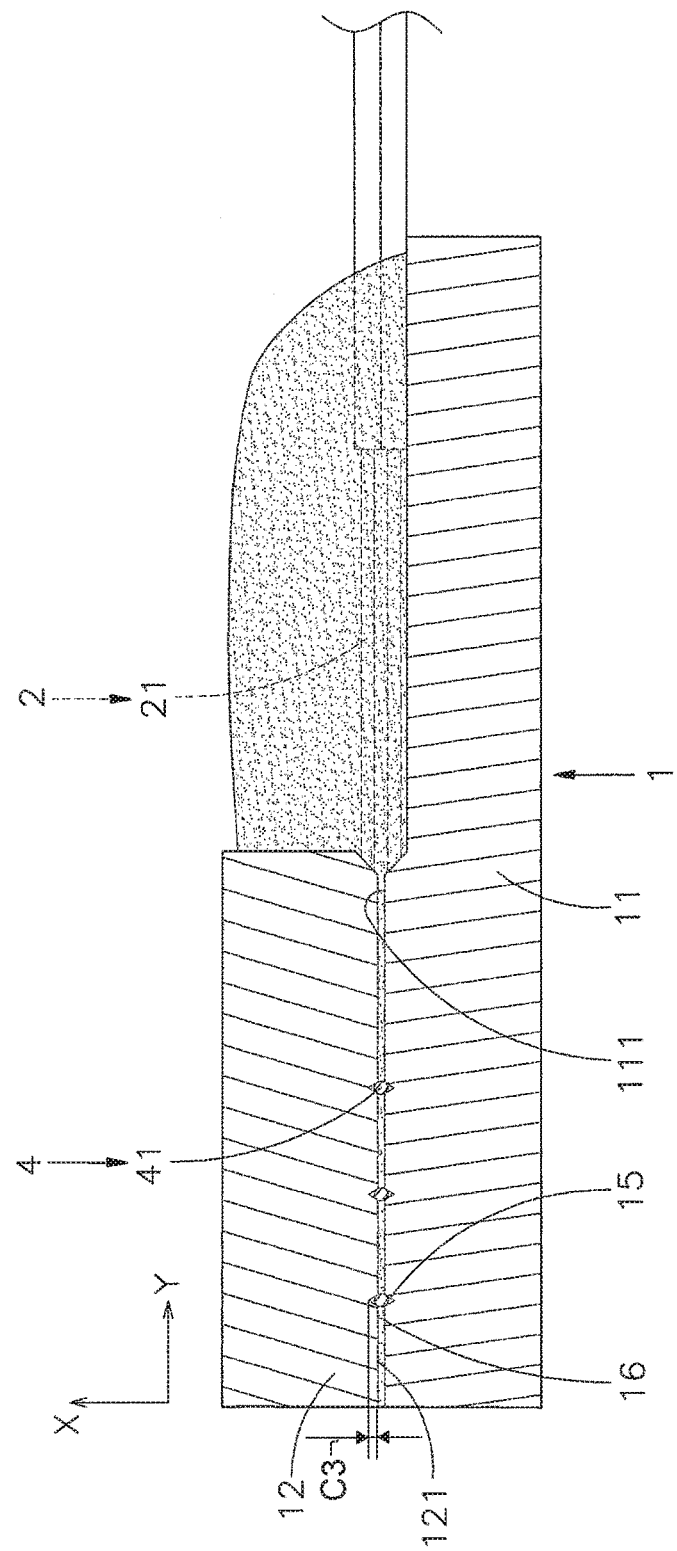
FIG. 7 is a sectional side view taken along a line A-A of FIG. 6.

Moreover, the first grooves 13, the second grooves 14 and the third grooves can be recessed on the abutment surfaces 111 and 121 with accuracy up to submicron-level (that is, smaller than 1 micron) by manner of micro-milling, cutting, grinding or other high precision machining, so as to obtain precise dimensions and surface roughness. Preferably, each of the first grooves 13, the second grooves 14 and the third grooves 15 can has a V-Groove section; however, in actual application, the section of each of the first grooves 13, the second grooves 14 and the third grooves 15 can be a trapezoid shape, a square shape, a serrate shape or the like. Referring to FIG. 6, a cutting depth C1 of the first groove 13 is larger than a cutting depth C2 of the second groove 14. Referring also to FIG. 7, the cutting depth C2 of the second groove 14 is larger than or equal to (that is, not smaller than) a cutting depth C3 of the third groove 15. Each of the baseboard 11 and the cover board 12 can be formed by heat-resistant glass (such as Pyrex glass, Borofloat 33, or BK7), quartz glass, monocrystalline silicon, multi-crystalline silicon wafer or other rigid material with high-temperature resistance and low thermal expansion coefficient, so as to prevent the baseboard 11 and the cover board 12 from expansion deformation while being heated. According to transparency, the material of the baseboard 11 and the cover board 12 can be classified into transparent material or non-transparent material.

The optical fiber cable 2 includes a plurality of first fiber cores 21 respectively positioned in the first grooves 13 of the base 1. The first fiber cores 21 form fiber layers 20 including at least two layers of array along X axis, and the two adjacent fiber layers 20 has the same number of the first fiber cores 21 in staggered arrangement.

The positioning fibers 3 include second fiber cores 31 respectively disposed in the second grooves 14 of the base 1, and outer surfaces of the at least two second fiber cores 31 are abutted with the inner sides of the baseboard 11 and the cover board 12 facing to each other, so as to pad between the baseboard 11 and the cover board 12 or separate the cover board 12 from the baseboard 11 by predetermined pitch D1 along X axis.

The spacer layer 4 includes a plurality of third fiber cores 41 disposed between the baseboard 11 and the cover board 12 and respectively located in the third grooves 15, outer surfaces of the third fiber cores 41 are respectively abutted with the two adjacent fiber layers 20 of the optical fiber cable 2, so as to separate the two adjacent fiber layers 20 from each other by predetermined pitch D2 along X axis.

In an embodiment, the first fiber core 21 of the optical fiber cable 2 can be a glass fiber, a plastic-clad silica fiber, a plastic optical fiber or like which has 125 μm of standard diameter, and can be classified into single-mode fiber or multi-mode fiber according to transmission mode. In addition, the multi-mode fiber can be further classified into a step-index fiber and a graded-index fiber according to refractive index distribution type. Moreover, in order to solve problems of dispersion and polarization variation in fiber, fibers for various purposes are developed, such as dispersion-shifted fiber, non-zero dispersion-shifted fiber, dispersion compensating fiber and polarization-maintaining optical fiber. The second fiber cores 31 of the positioning fibers 3 and the third fiber cores 41 of the spacer layer 4 can be above-mentioned optical fibers with predetermined diameter of 80 μm, 125 μm, 200 μm or other size.

During assembly of the two-dimensional fiber array structure of the present disclosure, adhesive is attached on the abutment surface 111 of the baseboard 11 of the base 1 by manner of coating, molding or dispensing, and ends of the optical fiber cables 2 where the cladding layers are stripped off to expose the first fiber cores 21, are respectively placed into the third grooves 15 of the baseboard 11. The third fiber cores 41 of the spacer layer 4 are cut to be predetermined length, then respectively placed into the third grooves 15 of the baseboard 11 and vertically staggered with the first fiber cores 21, and two ends of each of the third fiber cores 41 is extended out of two opposite sides of each of the first fiber layers 20. Other first fiber cores 21 of the optical fiber cable 2 are respectively abutted with outer surfaces of the third fiber cores 41 to form the second fiber layer 20. Next, the cover board 12 is placed on the baseboard 11 to respectively abut the first grooves 13, the second grooves 14 and the third grooves 15 of the abutment surface 121 of the cover board 12 with the outer surfaces of the first fiber cores 21, the second fiber cores 31 and the third fiber cores 41, so that the first fiber cores 21, the second fiber cores 31 and the third fiber cores 41 are pinched to be positioned and the predetermined pitch D1 is formed between the abutment surfaces 111 and 121. After the adhesive is cured, the baseboard 11, the cover board 12, and above-mentioned fibers can be stably combined integrally by an adhesive layer 16 (as shown in FIGS. 6 through 8) formed by cured adhesive.

Each of the first fiber cores 21 of the optical fiber cable 2 is abutted with the baseboard 11, the first groove 13 of the cover board 12, and the third fiber core 41 of the spacer layer 4 between two adjacent fiber layers 20 to form at least three-point contact, so as to be pinched for positioning. As a result, a core pitch between the two adjacent first fiber cores 21 can be a tiny pitch to prevent the first fiber cores 21 from being shifted, that is, the accuracy of positioning the optical fiber cable 2 on the baseboard 11 and the cover board 12 can be accurately controlled. Therefore, alignment of the first fiber cores 21 can be performed without wasting many working hours, and the working hour and cost in manufacturing can be saved. Moreover, the number of fiber layers 20 of the optical fiber cable 2 can be increased upon various requirement or design, and whole space configuration of the optical fiber cables 2 can be properly re-arranged without changing given sizes of the baseboard 11 and the cover board 12, so as to effectively solve conventional problem of transmission bandwidth limitation due to insufficient transmission channel, and the conventional problem of failure in miniaturization due to large space and height occupied by fibers. Compared with prior art, the two-dimensional fiber array structure of the present disclosure can contain more the optical fiber cable 2 in higher-density arrangement, and achieve miniaturization effect in whole volume.

In other embodiment, the two-dimensional fiber array structure of the present disclosure can be in a polygonal shape, a column shape or other shape, and end surface of the base 1 can be further formed with a 8-degree angle, a 6-degree angle or other angle by a manner of grinding, and can be coated with anti-reflective material to form an AR coating thereon. According to light interferometric principle, the AR coating can be used to perform interference of light and filtering of wavelength of light, so as to reduce the polarization dependent loss (PDL) of light and improve the optical coupling rate of the fiber array.

Figure 8:
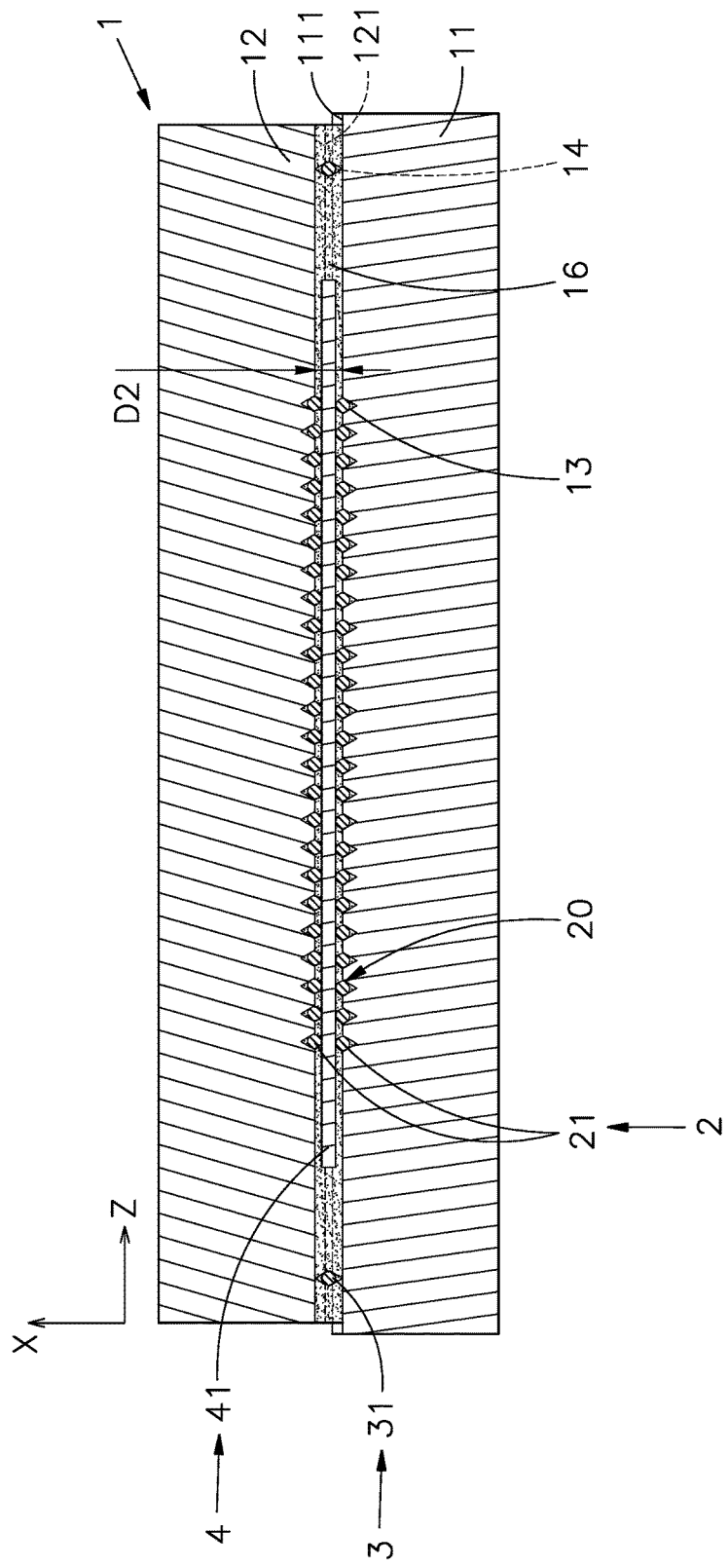
FIG. 8 is a sectional front view of the two-dimensional fiber array structure of the present disclosure.

Please refer to FIGS. 6 through 8 which respectively show front view of the two-dimensional fiber array structure, and sectional side view taken along a line A-A of FIG. 6, and sectional front view of the two-dimensional fiber array structure of the present disclosure. As shown in FIGS. 6 through 8, the first fiber cores 21 of the optical fiber cable 2 of the two-dimensional fiber array structure of the present disclosure are the polarization-maintaining optical fibers, and the two-dimensional fiber array structure of the present disclosure is applicable to coherent optical communication or fiber optic sensor. The core of the polarization-maintaining optical fiber can be doped with erbium ions to form a polarization-maintaining erbium-doped fiber applicable to high-power fiber amplifier, polarization-maintaining coupler or fiber laser.

The first fiber cores 21 of the optical fiber cable 2 are positioned in the first grooves 13 between the baseboard 11 and the cover board 12 of the base 1, and the second fiber cores 31 of the positioning fibers 3 are positioned in the second grooves 14 (such as V-shaped groove) at two external sides of the first grooves 13, so the predetermined pitch D1 can be accurately formed between the baseboard 11 and the cover board 12 along X axis. The third fiber cores 41 having predetermined diameter of 80 μm, 125 μm or 200 μm can be used to separate the two adjacent fiber layers 20 from each other by the predetermined pitch D2 along Y axis. The first grooves 13 of the base 1 may have tolerances caused by the machining process, so when the number of the fiber layers 20 of the optical fiber cable 2 or the number of the first fiber cores 21 of the fiber layer 20 is increased, the first fiber cores 21 of the two adjacent fiber layer 20 can be more accurately separated by the third fiber cores 41 of the spacer layer 4, which results in a smaller position tolerance of the two adjacent fiber layers along X axis. Under a condition that the position tolerance becomes smaller, the fiber array product has better accuracy, that is, the dimension and position accuracy of positioning the optical fiber cable 2 on the base 1 can be controlled accurately, so that loss of light can be reduced and the quality of transmitting optical signal can be improved. Therefore, the process yield is further improved to facilitate mass production and the quality and stability of transmitting optical signal can be ensured.

Figure 9:
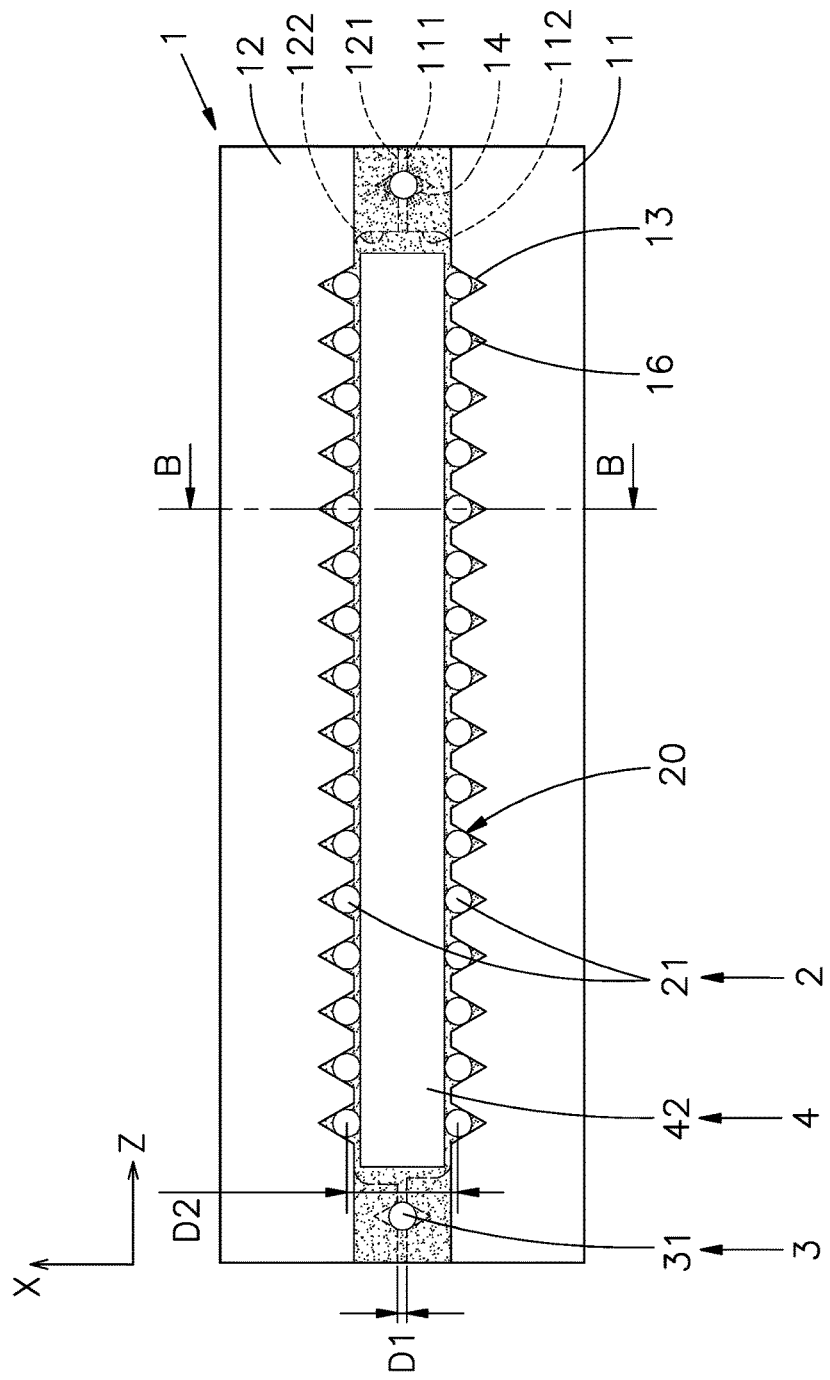
FIG. 9 is a front view of a preferred embodiment of the two-dimensional fiber array structure of the present disclosure.
Figure 10:
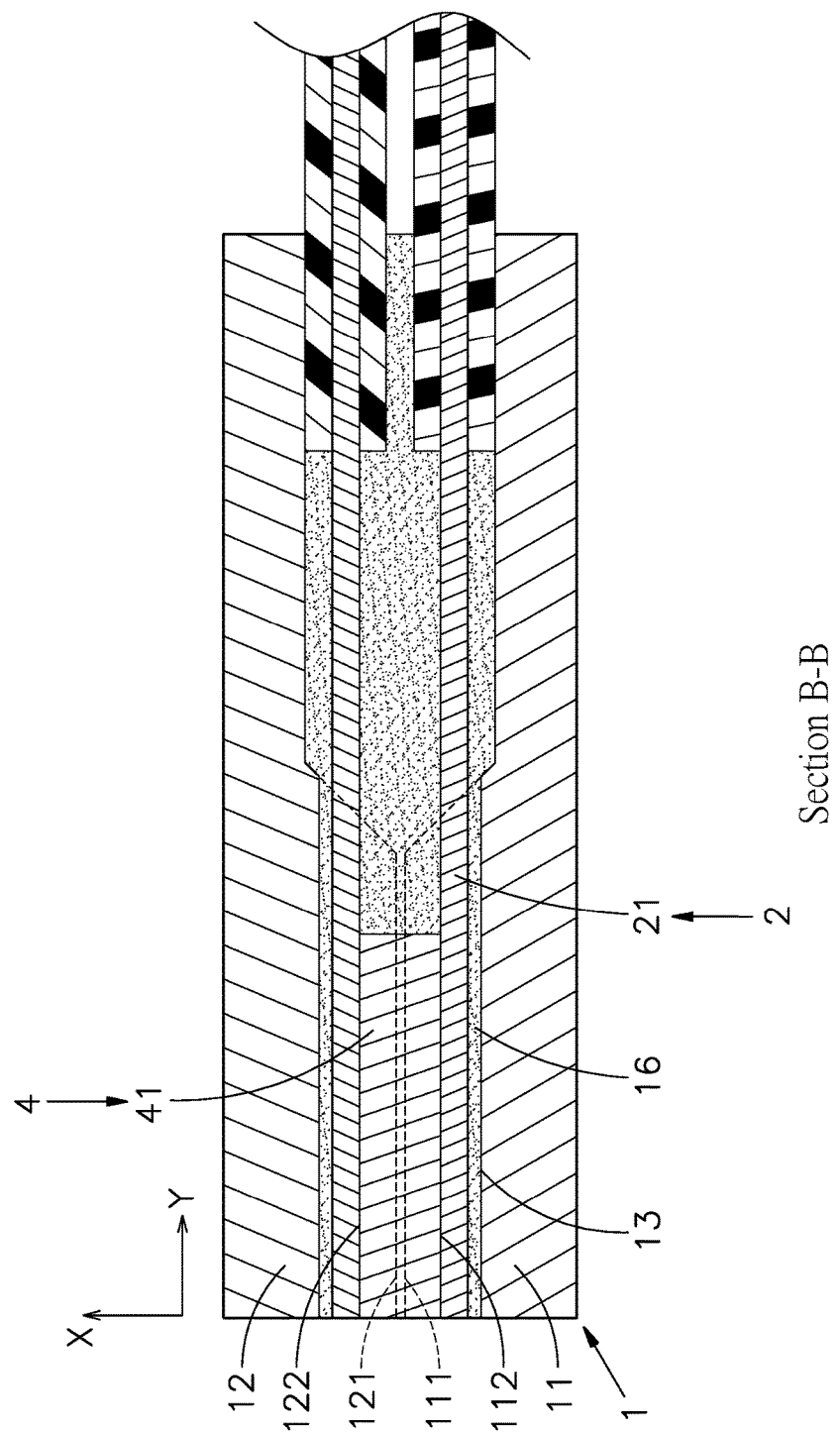
FIG. 10 is a sectional side view taken along a line B-B of FIG. 9.
Figure 11:
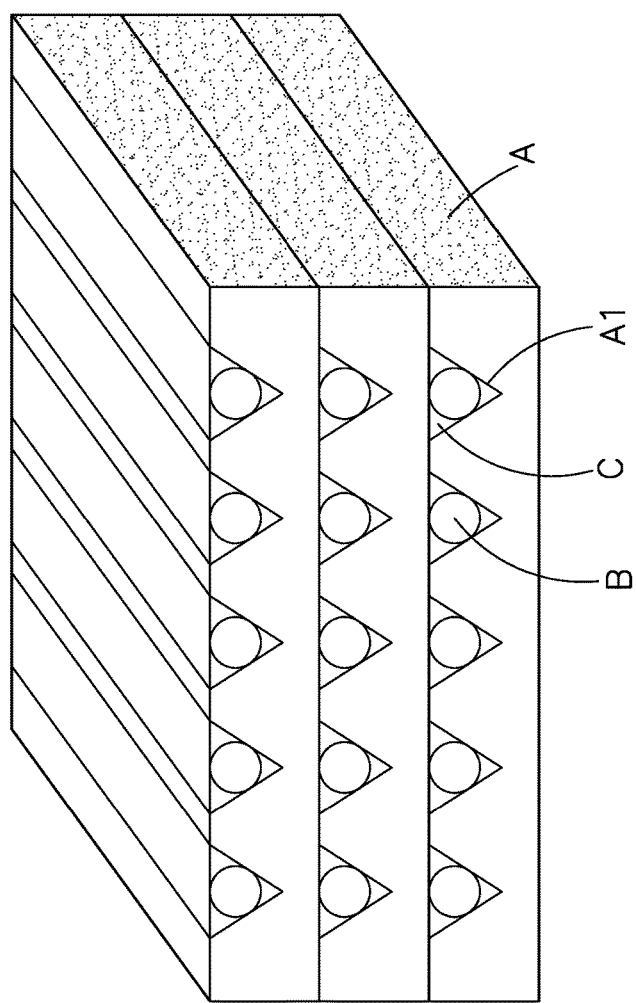
FIG. 11 is an elevational view of conventional fiber array structure.
Figure 12:
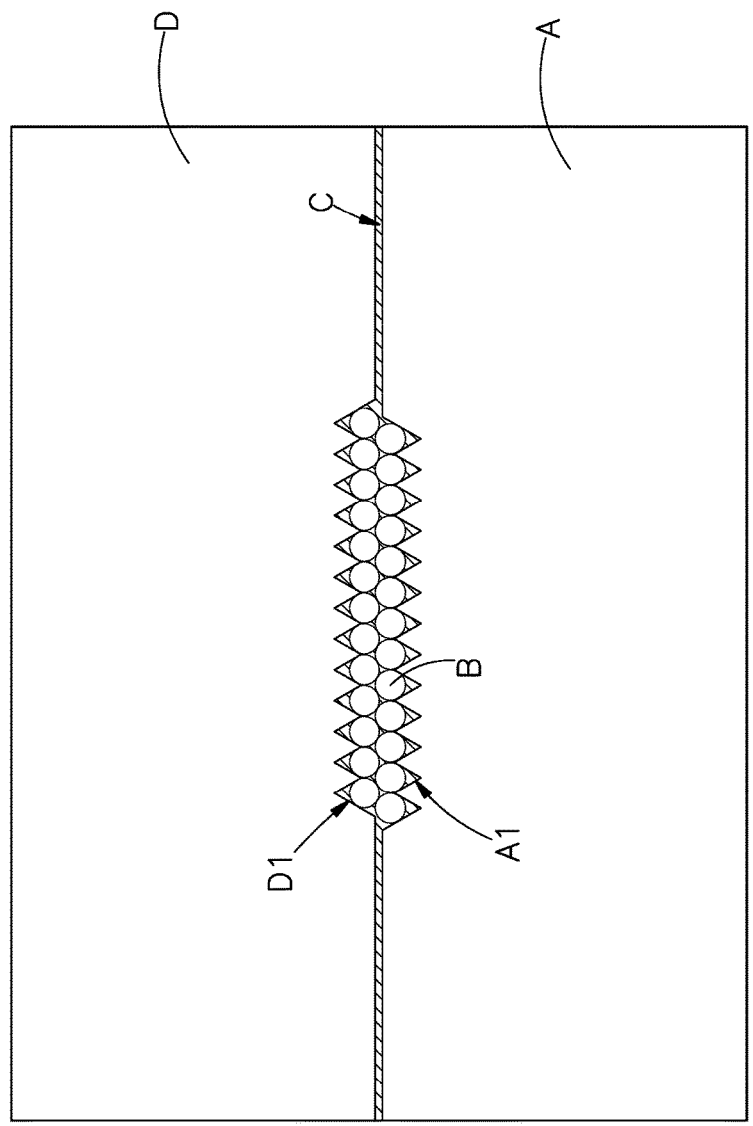
FIG. 12 is a front view of other conventional fiber array structure.

Please refer to FIGS. 9 and 10 which show front view of a preferred embodiment of the present disclosure, and a sectional side view taken along a line B-B of FIG. 9. The sizes and shapes of the baseboard 11 and the cover board 12 of the base 1 can be properly designed upon actual application. The at least two positioning fibers 3, which is positioned at two external sides of the optical fiber cable 2 and between the baseboard 11 and the cover board 12, can be used to separate the baseboard 11 from the cover board 12 by the predetermined pitch D1 along X axis. By manner of high precision machining, the abutment surfaces 111 and 121 can be processed to form positioning grooves 112 and 122 recessed thereon, and the positioning grooves 112 and 122 are processed to form at least one first grooves 13 recessed on bottom surface thereof along Z axis, and the first grooves 13 of the baseboard 11 and that of the cover board 12 are respectively aligned with each other along X axis.

In the preferred embodiment, the spacer layer 4 includes the third fiber cores 41 disposed between the baseboard 11 and the cover board 12, and respectively positioned in the two opposite third grooves 15, and abutted with the two adjacent fiber layers 20 of the optical fiber cable 2. In actual application, the third grooves 15 of the baseboard 11 and the cover board 12 can be omitted, and the spacer layer 4 can include a divider 42 made from material having a thermal expansion coefficient similar to that of the base 1, upon structural design process requirement. The divider 42 can have a thickness of 0.125 mm, 0.375 mm or other predetermined dimension, and positioned in the positioning grooves 112 of the baseboard 11 and positioning grooves 122 of the cover board 12. Upper and lower sides of the divider 42 are respectively abutted with the two adjacent fiber layers 20 of the optical fiber cable 2, so that the two adjacent fiber layers 20 are more accurately separated from each other along X axis by the predetermined pitch D2 of 0.25 mm or 0.5 mm. Any manner of separating the two adjacent fiber layers 20 along X axis, and various equivalent changes, alternations or simple modifications in structure of the spacer layer 4 are all consequently viewed as being embraced by the scope of the present disclosure.

In conclusion, main technical feature of the present disclosure is that the abutment surfaces 111 and 121 of the baseboard 11 and the cover board 12 of the base 1 facing to each other are respectively provided with the first grooves 13 recessed thereon, and the second grooves 14 are respectively recessed on two external sides of the first grooves 13, the first fiber cores 21 of the optical fiber cable 2 are respectively positioned in the first grooves 13, the second fiber cores 31 of the optical fibers 3 are respectively positioned in the second grooves 14 of the base 1 opposite to each other, the predetermined pitch D1 is accurately formed between the baseboard 11 and the cover board 12 along X axis, and the spacer layer 4 including the third fiber cores 41 or the divider 42 are used to abut between the first fiber cores 21 of the two adjacent fiber layers 20 of the optical fiber cable 2 to more accurately separate them from each other by the predetermined pitch D2, so that the position tolerance along X axis becomes smaller and the accuracy is improved, whereby improving process yield to facilitate mass production, and further ensuring quality and stability of transmitting the optical signal.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A two-dimensional fiber array structure comprising:
a base defining X, Y, and Z axes;
an optical fiber cable;
at least two positioning fibers; and
a spacer layer, wherein
the base comprises a baseboard and a cover board located above the baseboard, an abutment surface of each of the baseboard and the cover board face each other, each abutment surface of the baseboard and the cover board comprises a plurality of first grooves recessed on the abutment surface and extending along the Y axis at a cutting depth C1, each abutment surface of the baseboard and the cover board comprises a plurality of second grooves respectively recessed on two external sides of the first grooves and extending along the Y axis at a cutting depth C2, the second grooves of the baseboard correspond in position to the second grooves of the cover board, each abutment surface of the baseboard and the cover board comprises a plurality of third grooves recessed on the abutment surface at a cutting depth C3 and extending along the Z axis, the third grooves of the baseboard correspond in position to the third grooves of the cover board, the third grooves intersect with and extend through the first grooves on each abutment surface, the cutting depth C1 is larger than the cutting depth C2 and the cutting depth C3, the cutting depth C2 is larger than or equal to the cutting depth C3, the optical fiber cable comprises a plurality of first fibers positioned in the first grooves, the first fibers form at least two layers of fiber arrays, each of the at least two positioning fibers comprises a second fiber disposed in the second grooves of the base to separate the baseboard and the cover board from each other along the X axis, and the spacer layer comprises a plurality of third fibers respectively positioned in the plurality of third grooves and between the layers of fiber arrays to separate the layers of fiber arrays from each other along the X axis.

2. The two-dimensional fiber array structure according to claim 1, wherein the plurality of first grooves of the baseboard are staggered with the plurality of first grooves of the cover board along the X axis.

3. The two-dimensional fiber array structure according to claim 1, wherein: the plurality of third grooves are arranged in parallel with each other and perpendicular with the first grooves.

4. The two-dimensional fiber array structure according to claim 3, wherein two ends of each of the third fibers of the spacer layer is extend beyond two sides of the at least two layers of fiber arrays of the optical fiber cable along the Z axis.

5. The two-dimensional fiber array structure according to claim 3, wherein each of the third fibers of the spacer layer has a diameter of 80 μm, 125 μm or 200 μm.

6. The two-dimensional fiber array structure according to claim 1, wherein the baseboard and the cover board of the base, the first fibers of the optical fiber cable, the second fibers of the at least two positioning fibers, and the spacer layer are combined integrally by an adhesive layer which is formed by cured adhesive.

7. The two-dimensional fiber array structure according to claim 1, wherein each of the first fibers of the optical fiber cable has a diameter of 125 μm.

8. The two-dimensional fiber array structure according to claim 1, wherein each of the second fibers of the at least two positioning fibers has a diameter of 80 μm, 125 μm or 200 μm.

9. The two-dimensional fiber array structure according to claim 1, wherein the third grooves intersect with and extend through the first grooves and the second grooves.

10. The two-dimensional fiber array structure according to claim 1, wherein the second grooves of the base are positioned on either side of the spacer layer along the Z axis.

11. The two-dimensional fiber array structure according to claim 1, wherein the third fibers extend through a least a portion of the cutting depth C1 of the first grooves.

* * * * *

UNITED STATES PATENT AND TRADEMARK OFFICE
CERTIFICATE OF CORRECTION

| | | |
|---|---|---|
| PATENT NO. | : 9,709,750 B1 | Page 1 of 1 |
| APPLICATION NO. | : 15/188085 | |
| DATED | : July 18, 2017 | |
| INVENTOR(S) | : Wen-Lung Kuang et al. | |

It is certified that error appears in the above-identified patent and that said Letters Patent is hereby corrected as shown below:

In the Claims

Column 10, Claim 4, Line 9:
"spacer layer is extend beyond two sides of the at least two"
Should read:
--spacer layer extend beyond two sides of the at least two--; and Column 10, Claim 11, Line 35:
"claim 1, wherein the third fibers extend through a least a"
Should read:
--claim 1, wherein the third fibers extend through at least a--.

Signed and Sealed this
Fifth Day of June, 2018

Andrei Iancu
*Director of the United States Patent and Trademark Office*